(12) United States Patent
Du et al.

(10) Patent No.: US 7,776,775 B2
(45) Date of Patent: Aug. 17, 2010

(54) CRACKING CATALYST AND A PREPARATION PROCESS FOR THE SAME

(75) Inventors: Jun Du, Beijing (CN); Zheng Li, Beijing (CN); Jun Long, Beijing (CN); Mingde Xu, Beijing (CN); Zhijian Da, Beijing (CN); Huiping Tian, Beijing (CN); Mingyuan He, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 0 days.

(21) Appl. No.: 11/910,252

(22) PCT Filed: Mar. 31, 2006

(86) PCT No.: PCT/CN2006/000573

§ 371 (c)(1),
(2), (4) Date: Mar. 14, 2008

(87) PCT Pub. No.: WO2006/102852

PCT Pub. Date: Oct. 5, 2006

(65) Prior Publication Data

US 2008/0261802 A1 Oct. 23, 2008

(30) Foreign Application Priority Data

Mar. 31, 2005 (CN) .................. 2005 1 0059774

(51) Int. Cl.
*B01J 29/06* (2006.01)
(52) U.S. Cl. .............. 502/65; 502/73; 502/79
(58) Field of Classification Search ............. 502/73, 502/79, 65
See application file for complete search history.

(56) References Cited

U.S. PATENT DOCUMENTS

| | | | |
|---|---|---|---|
| 3,293,192 A | 12/1966 | Maher et al. | |
| 3,384,572 A | 5/1968 | Myers et al. | |
| 3,506,440 A | 4/1970 | Sugimoto | |
| 4,376,039 A | 3/1983 | Gladrow et al. | |
| 4,503,023 A | 3/1985 | Breck et al. | |
| 4,900,428 A | 2/1990 | Mester | |
| 4,938,863 A | 7/1990 | Degnan et al. | |
| 4,985,384 A | 1/1991 | Gilson | |
| 5,164,073 A | 11/1992 | Lam | |
| 5,248,642 A | 9/1993 | Kumar et al. | |
| 5,535,817 A * | 7/1996 | Dunne | 165/104.12 |
| 5,646,082 A | 7/1997 | Tan-no et al. | |
| 6,787,123 B2 * | 9/2004 | Du et al. | 423/713 |
| 6,991,774 B2 * | 1/2006 | Du et al. | 423/713 |
| 7,514,385 B2 * | 4/2009 | Du et al. | 502/73 |
| 2003/0064881 A1 * | 4/2003 | Du et al. | 502/65 |

FOREIGN PATENT DOCUMENTS

| | | |
|---|---|---|
| CN | 1052290 A | 6/1991 |
| CN | 1058382 A | 2/1992 |
| CN | 1147420 | 4/1997 |
| CN | 1194181 A | 9/1998 |
| CN | 1121903 C | 9/2003 |
| CN | 1493656 | 5/2004 |
| CN | 1162327 C | 8/2004 |

\* cited by examiner

*Primary Examiner*—Elizabeth D Wood
(74) *Attorney, Agent, or Firm*—Dickstein Shapiro LLP (57) ABSTRACT

The present invention provides a cracking catalyst, containing a rare-earth Y-zeolite and a support, which is characterized in that the rare-earth content in crystal lattice of the rare-earth Y-zeolite is 4-15 wt % of $RE_2O_3$; the original unit cell size is 2.440-2.465 nm; the equilibrium unit cell size of the catalyst after 100% steam-aging treatment at 800° C. for 17 hours is larger than 2.435 nm; the rare-earth atom content in the support is 1.0-8.0 wt % of the support. The present invention also relates to a preparation process for the same catalyst.

15 Claims, 4 Drawing Sheets

CRACKING CATALYST AND A PREPARATION PROCESS FOR THE SAME

TECHNICAL FIELD

The present invention relates to a preparation process for a petroleum hydrocarbon catalytic cracking catalyst, and more particularly to a molecular sieve cracking catalyst produced by the gas phase chemical method and a preparation process for the same.

BACKGROUND

For the refining field, increasing the quality of catalyst, lowering the cost of production, reducing the consumption of energy and raw material, and preventing environmental pollution are always being pursued.

Figure 1:
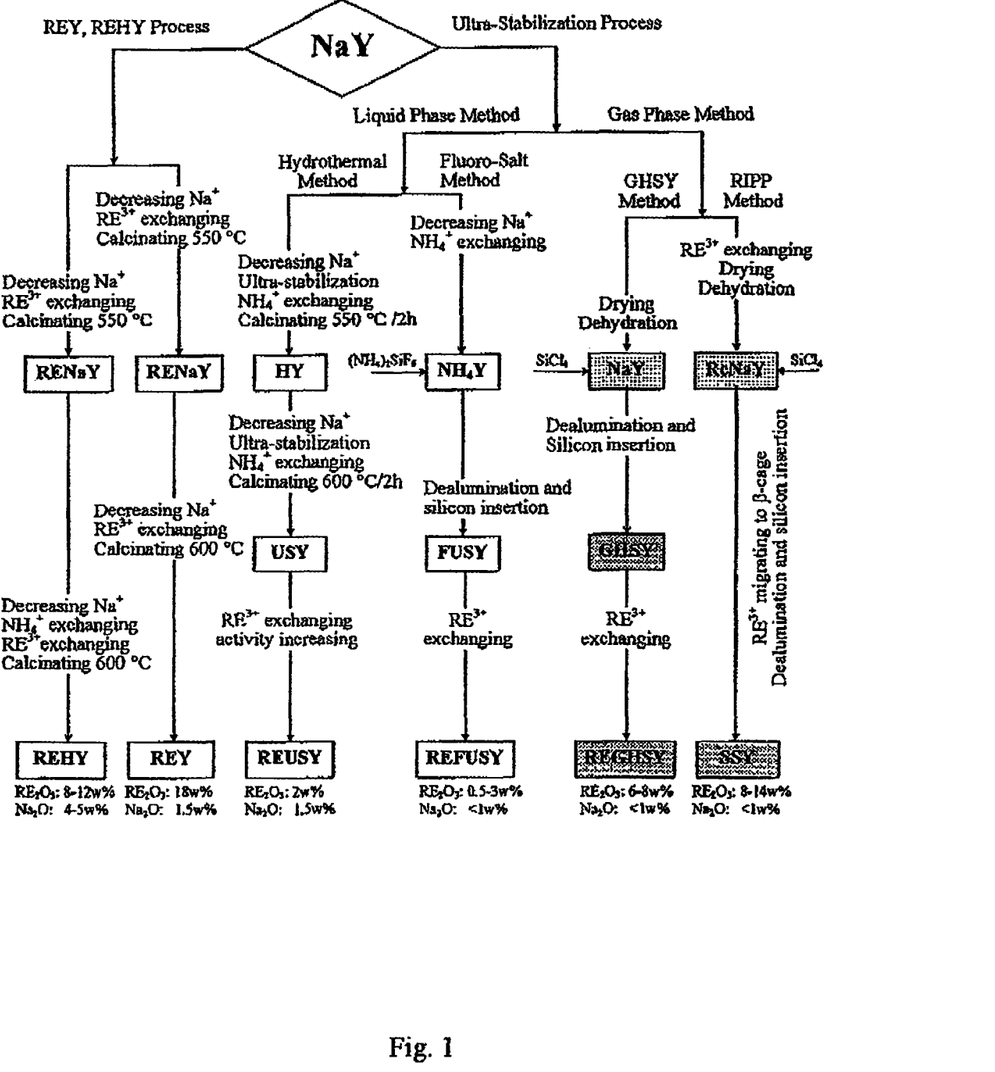
FIG. 1 is a diagram showing the development of modifying the Y-zeolite.

From the 1960's, Y-zeolite was widely used in the catalytic cracking catalyst in the petroleum refining process. After continuous research and development, a series of products were hitherto developed. It can be seen from FIG. 1 that focusing on increasing the cracking activity, the hydrogen transfer activity, hydrothermal stability of the Y-zeolite, the new products have continuously been researched and developed along two ways, in which one is improving the chemical composition of the zeolite, the other is improving the preparation process of the zeolite.

In the beginning of the zeolite application, it was found that the NaY zeolite has no activity on the acidic catalytic reaction. U.S. Pat. No. 3,384,572 and U.S. Pat. No. 3,506,440 disclosed the HY zeolite was prepared by exchanging $Na^+$ with $NH_4^+$. The HY zeolite has a high activity, but poor structural stability: it loses its crystallinity when heated in dry air above 500° C., and its structure is destroyed when placed in the air at RT. Further, the REHY zeolite was prepared by using $RE^{3+}$ instead of $NH_4^+$, and the activity and the thermal stability of the Y-zeolite were further improved because of improvements in its composition.

Along with the increasing amount of heavy oils to be processed, REHY zeolite has a relatively poor hydrothermal stability in the device and tends to be inactivated. The defect of the liability to coke formation gradually appeared. Then the preparation process, with the modified NaY zeolite, was used to prepare the Y-zeolite having a high Si/Al ratio. Recently, there have been great developments in the preparation process for the modified Y-zeolite.

From 1967, U.S. Pat. No. 3,293,192 and the like reported the exchange of NaY with $NH_4^+$ followed by steam calcinating at 600-825° C. A Y-zeolite (i.e. USY) was prepared by the hydrothermal process, including many times of ion-exchanging and calcinating at a high-temperature, the aim of which is to decrease the content of $Na_2O$ in the zeolite and facilitate the dealumination and silicon insertion. After more than 20 years of research and improvement of this process, the hydrothermal process for preparing the ultra-stable Y-zeolite is formed, which is now widely used in the industry.

For further improving the reaction performance of USY, the method of exchanging with $RE^{3+}$ is still used to prepare REUSY. However, the problems of the relative low crystallinity in the preparation and the low content of $RE_3O_2$, as well as the high content of $Na_2O$ and the difficult removal of $Na_2O$ can not be solved radically and thoroughly.

For improving the crystallinity of the zeolite, U.S. Pat. No. 4,503,023 reported a preparation process for modifying Y-zeolite with $(NH_4)_2SiF_6$ fluorosilicate salt in the liquid phase. However, because $F^+$ ion pollutes the environment and some harmful stray crystals are produced in the reaction process, which has adverse impacts on the zeolite, thus, such process is not widely used in the industry.

In 1980's, Beyer disclosed the principle of preparing a Y-zeolite having a high Si/Al ratio by the gas phase chemical method of $SiCl_4$. Meanwhile, the Research Institute of Petroleum Processing (RIPP) also conducted industrial application research on the Y-zeolite having a high Si/Al ratio prepared by the gas phase chemical method. The preparation process for the Y-zeolite having a high Si/Al ratio by the gas phase chemical method has now been industrialized as the product designation of GHSY (see FIG. 1, the GHSY method).

In order to adapt a new requirement for the performance of the clean fuel catalyst active component, the RIPP further developed a new process for preparing a molecular sieve by the gas phase chemical method (CN ZL01115612.0 and ZL01115613.9) as the product designation of SSY. Said process can be effective to control the position of the rare-earth ions in the crystal lattice of the Y-zeolite, the migration property, and the existence state of the rare-earth ions. Through an overall characterization of the product, said product has both the characteristics of a high rare-earth content, a high cracking activity and a hydrogen transfer activity of the REHY zeolite and the characteristics of a high Si/Al ratio and a high hydrothermal stability of the REUSY zeolite. Therefore, the process and the product prepared by the same have a good application prospect.

Figure 2:
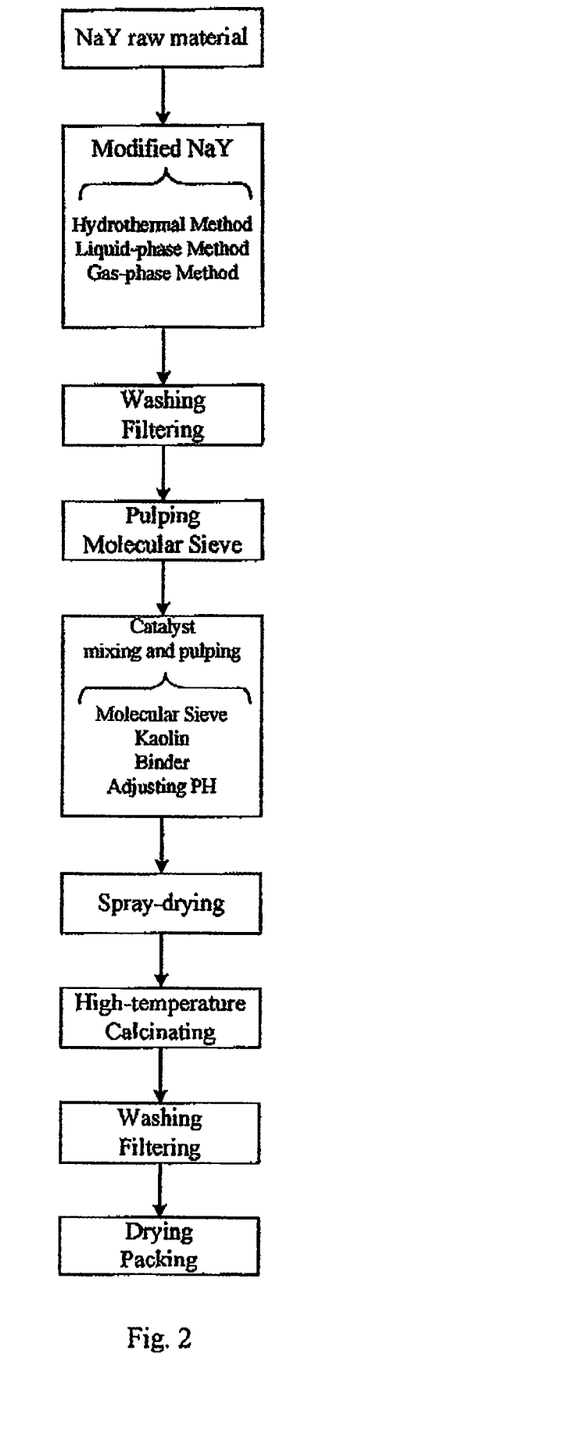
FIG. 2 is a preparation process for the conventional catalyst.

The preparation process of the catalyst is another key point of interest. Since finding the molecular sieve catalyst in 1960's, the preparation process of the molecular sieve and the catalyst produced therefrom, as shown in the FIG. 2, was used all along. As seen from the FIG. 2, the washing/filtering of the molecular sieve and the high-temperature calcination of the catalyst are two essential steps, the aims of which are to remove the $Na_2O$ contained in the zeolite, so as to achieve the quality requirement for the catalyst. These are the major steps in which energy, materials, and water are consumed greatly, and the three wastes (i.e. ammonium, nitrogen pollutants, and silica gel as well as alumina gel) are generated.

In the current hydrothermal method and the Bayer gas phase method, ultra-stabilized molecular sieves are both requisite of washing and filtering to remove the harmful ions such as $Na^+$, $NH_4^+$, $SO_4^{2-}$ and the like, which are generated during the ultra-stabilization. However, this also leads to the removal of the beneficial ions such as $Si^{4+}$, $Al^{3+}$, and $Cl^-$ for the preparation process of the catalyst as well as the non-exchanged $RE^{3+}$. Washing and filtering the molecular sieve require a great quantity of decationized water, and a great quantity of waste liquid resulting from washing and filtering makes it difficult to reach the acceptable environmental protection levels even after treating. Moreover, during the preparation process of the catalyst, the spray-dried catalyst generally needs to be subjected to a high-temperature calcination, the aim of which is to simplify the washing and ion-exchanging process of the molecular sieve, and to remove the $Na^+$ ion inside and outside the molecular sieve skeleton. However, the high-temperature calcination process and multiple ion-exchanges with $(NH_4)_2SO_4$ still cannot resolve the problem of the $NH_4^+$, $SO_4^{2-}$, and $Na^+$ contaminations.

DISCLOSURE OF THE INVENTION

The object of the present invention is to provide a novel cracking catalyst and a preparation process for the same.

The present invention provides a cracking catalyst, containing a rare-earth Y-zeolite and a support, which is characterized in that the rare-earth content in crystal lattice of the rare-earth Y-zeolite is 4-15 wt % of $RE_2O_3$; the original unit cell size is 2.440-2.465 nm; the equilibrium unit cell size of the catalyst after 100% steam-aging treatment at 800° C. for 17 hours is larger than 2.435 nm; and the rare-earth atom content in the support is 1.0-8.0 wt % of the support.

The present invention also provides a preparation process for the cracking catalyst, comprising the steps of:

(1) Ultra-stabilizing the Y-zeolite, mixing the ultra-stabilized Y-zeolite directly with deionized water, pulping, and optionally milling to give a molecular sieve slurry;

(2) Mixing the molecular sieve slurry with a binder slurry and a clay and pulping, or pulping with the binder slurry and the clay in sequence, and forming by spray drying; and (3) Washing the formed catalyst, filtering and drying.

Compared with the prior art, the catalyst according to the present invention is characterized by stable molecular sieve unit cell structure, high rare-earth content, low sodium oxide content, and high differential thermal collapse temperature, as well as high cracking activity, high conversion of heavy oil and high yield of light oil. Meanwhile, the catalyst of the present invention also significantly decreases the olefin content and has a resistance to heavy metal contamination. Therefore, it is an excellent hydrocarbon cracking catalyst, and can be used to treat various raw oils, especially inferior raw oils.

The preparation process for the catalyst according to the present invention has the following benefit effects:

The present process has a full utilization of the isomorphous replacement of the dealumination and silicon insertion during the course of preparing the molecular sieve by the gas-phase chemical method so as to be able to remove $Na^+$ ion inside and outside the skeleton in one step during the ultra-stabilization, and can efficiently utilize ions such as $Si^{4+}$, $Al^{3+}$, $Cl^-$ and $RE^{3+}$ which is removed during the course of the dealumination and silicon insertion so as to convert them to valuable raw materials for preparing the catalyst. For example, in the subsequent preparation steps, converting $Si^{4+}$ to an excellent silica-sol, converting $Al^{3+}$ to an excellent alumina-sol, combining $Cl^-$ and $H_2O$ to be used as the acidic peptizing agent of pseudoboehmite and the like, can not only improve the catalyst binding properties and increase the catalyst strength, but also solve problems such as equipment damage caused by the residual $SiCl_4$ waste liquid and the environmental pollution.

Because the present invention can fully utilize the residual $Cl^-$ remaining during the course of preparing the molecular sieve, and convert it to HCl to use as the peptizing agent for acidifying pseudoboehmite, therefore, compared with the prior art, the amount of HCl to be used can be saved by 30-70%, even by 100% (not using HCl absolutely). The exchangers such as $(NH_4)_2SO_4$ and $NH_4Cl$, which tend to pollute the environment, can absolutely not be used in the course from ultra stabilizing the molecular sieve to preparing the catalyst according to the present invention, therefore, ammonium-nitrogen pollution can be avoided. According to the present invention, pulping immediately after ultra stabilizing the molecular sieve without the steps of washing and ion-exchanging, and using the colloid-milled molecular sieve slurry as an acidifier to acidify pseudoboehmite, can fully utilize a part of $RE^{3+}$ ion removed in the step of ultra stabilization into the course of preparing the catalyst, therefore, increasing the utilization rate of $RE^{3+}$ ion efficiently, increasing the content of $RE_2O_3$ in the catalyst, in particular, the content of rare earth atoms in the support, increasing efficiently the catalyst cracking activity and the conversion of heavy oil, and providing a gasoline product having a lower olefin content.

With the preparation process according to the present invention, the content of the molecular sieve in the catalyst can be significantly reduced, for example, to below 35%. Therefore, the producing cost of the catalyst can reduced remarkably.

With the preparation process according to the present invention, the steps of washing, ion-exchanging and filtering after ultra stabilizing the molecular sieve can be omitted, so that the whole process from the molecular sieve to the catalyst is markedly simplified. Therefore, the preparation process for the catalyst can be shortened remarkably.

EMBODIMENTS

The cracking catalyst provided by present invention is characterized in that the rare-earth content in the crystal lattice of the rare-earth Y-zeolite is 6-12 wt % of $RE_2O_3$. The original unit cell size of the rare-earth Y-zeolite is 2.445-2.460 nm, preferably 2.450-2.458 nm. The equilibrium unit cell size of the catalyst after 100% steam-ageing treatment at 800° C. for 17 hours is larger than 2.440 nm, preferably larger than 2.445 nm. The rare-earth atom content in the support is 1.0-6.0 wt % of the support.

The content of the rare-earth Y-zeolite in the catalyst is 10-50 wt %, preferably 15-40 wt %, more preferably 15-35 wt %. The differential thermal collapse temperature of the rare-earth Y-zeolite is 1000-1056° C.

The rare-earth Y-type zeolite in the catalyst of the present invention is described in Chinese Patent Application CN 01115613.9. This zeolite has a relatively high Si/Al ratio in the skeleton, and the Si/Al ratio is from 8.3 to 8.8.

The catalyst of the present invention can also contain a zeolite with MFI structure as an active component. The zeolite with MFI structure is selected from ZSM-5 or one or more of the molecular sieves with MFI structure, such as the five-member ring rare-earth containing zeolite with high silica content (designated as ZRP) disclosed in CN 1052290 A, CN 1058382 A, CN 1147420 A and CN 1194181 A. This zeolite is prepared by using REY or REHY zeolite with rare-earth content of 2-23 wt % of the oxide and Na content less than 5.0 wt % as crystal seeds. The weight ratio of the zeolite with MFI structure and the rare-earth Y-zeolite is preferably from 0.01 to 0.5.

The preparation process for the catalyst provided by the present invention will be discussed in the following details. Drying the Y-zeolite until its water content is less than 10 wt %, letting in the $SiCl_4$ gas or the $SiCl_4$ gas carried by dry air with a weight ratio of $SiCl_4$ to the Y-zeolite being 0.1-0.9:1, reacting them at 100-600° C. for 10 min to 6 hours followed by purging the Y-zeolite with dry air for 5 min to 2 hours; pulping the resulting Y-zeolite and water with a weight ratio of the zeolite to $H_2O$ being 1:1-10, preferably 1:1.5-3, and milling finely with a colloid mill to its particle size of 1-0.3 μm; mixing with a pseudoboehmite slurry having a solids content of 8-15 wt % and peptizing, then mixing with a clay slurry having a solids content of 20-40 wt % and pulping for 1-2 hours, and forming by spray drying at 280-300° C.; washing the formed catalyst with decationized water at 60° C. with a weight ratio of the catalyst to water being 1:10, then filtering and drying.

In the preparation process provided by present invention, the ultra-stabilization process of the Y-zeolite disclosed in step (1) has been described in Chinese patent application CN 01115612.0. Based on the gas phase chemical method of $SiCl_4$ and the facile diffusibility of the substance in the gaseous state, $SiCl_4$ with dynamics radius of 0.687 nm was introduced in the gaseous state into the channels of the zeolite in this preparing process. In effective combination with the NaY zeolite having a strong adsorptivity, the isomorphous replacement reaction was carried out with the dealumination and silicon insertion.

The Y-zeolite raw material disclosed in step (1) may be the REY or REHY zeolite widely used in the industry, and may also be the NaY zeolite or the RENaY zeolite.

In general, the rare-earth content of the REHY zeolite is from 6 to 14 wt % of $RE_2O_3$, and the $Na_2O$ content thereof is not more than 6 wt %. The rare-earth content of the REY zeolite is from 10 to 18 wt % of $RE_2O_3$ and the $Na_2O$ content thereof is not more than 3 wt %. The rare-earth ion exchange process of the NaY zeolite is carried out by exchanging the NaY zeolite with Si/Al ratio higher than 3.5 and the rare-earth chloride solution in a weight ratio of $NaY:RECl_3:H_2O$=1:0.1-0.25:5-15 at 80-90° C. for 30 to 60 min under a pH more than 3.5, and then optionally drying. The rare-earth content of the RENaY zeolite is from 6 to 15 wt % of $RE_2O_3$, and the $Na_2O$ content thereof is not more than 6 wt %.

In the preparation process of the present invention, the REHY and REY raw materials or the NaY zeolite ion-exchanged with the rare-earth chloride solution used to prepare the Y-zeolite disclosed in step (1) have to be dried prior to the reaction so that their water contents are less than 10 wt %, preferred less than 5 wt %.

In the process of the present invention, the ultra-stabilized Y-zeolite is neither required of ion-exchanging with the exchanger such as $(NH_4)_2SO_4$ and $NH_4Cl$, nor many times of ion-exchanging and calcinating at a high-temperature to remove $Na^+$ ion. Said ultra-stabilized Y-zeolite can be directly used as an acidifier to peptize the pseudoboehmite after pulping and colloid-milling without washing, ion-exchanging and filtering, and it is directly added to the clay slurry or other binders followed by stirring and spray-drying to form the catalyst.

In the preparation process for the catalyst according to the present invention, step (2) comprises mixing the raw materials including 10-50 wt % of the Y-zeolite from the step (1), 10-60 wt % of the binder, and 2-75 wt % of the clay, pulping, and forming by spray drying; preferably, mixing the raw materials including 15-40 wt % of the Y-zeolite from the step (1), 15-40 wt % of the binder, and 20-60 wt % of the clay, pulping, and forming by spray drying; more preferably mixing the raw materials including 15-35 wt % of the Y-zeolite from the step (1), 15-40 wt % of the binder, and 20-60 wt % of the clay, pulping, and forming by spray drying. In said step (2), the preferable sequence is that: the molecular sieve slurry is firstly mixed and pulped with the binder slurry, and then the resulting slurry is mixed and pulped with the clay.

In the preparation process for the catalyst according to the present invention, the binder disclosed in step (2) is selected from one or more of pseudoboehmite, alumina sol, silica sol and phosphorus-alumina sol, preferred the double-alumina binder, in which the weight ratio of pseudoboehmite and alumina sol is 10-40:0-30, preferably 15-25:2-25. When the double-alumina binder is used, desirably, the pseudoboehmite is first peptized with the molecular sieve slurry of the present invention, and then the resulting material may be mixed with alumina sol, silica sol, phosphorus-alumina sol or other binders.

In the preparation process for the catalyst according to the present invention, said clay is the clay usually used in cracking catalyst matrix, such as kaolin, halloysite, montmorillonite, bentonite or sepiolite, etc.

In the preparation process of the present invention, the step (2) comprises mixing the raw materials including the molecular sieve, the clay and the binder, pulping homogenously, and forming by spray-drying at the inlet temperature of 550-600° C. and the outlet temperature of 250-300° C.

The following examples are used to illustrate the present invention, but are not intended to limit the scope of the present invention in any way.

In the examples, the $RE_2O_3$ and $Al_2O_3$ contents of the catalyst samples were measured by fluorometry; the unit cell size is measured by the powder X-ray Diffraction (XRD); in the catalyst samples, the element contents of Al, Si, Na, La and Ce in the support are measured by a high resolution environment scanning electron microscope (FEI Quantan 200 FEG model, equipped with EDX energy spectrometer), the major parameters including a secondary electron (SE) imaging, a low vacuum mode, an accelerating voltage of 20 KV, and a pressure in the sample chamber of 100 Pa; the morphology-image analysis is conducted on the particles of each catalyst sample with a magnification of 800×-1500×; and the microscopic analysis for the outer surface is conducted on the catalyst samples with EDX energy spectrometer to measure element contents.

The differential thermal analysis (DTA) measurement is conducted by means of an apparatus from the TA Ltd, US (Model: TA5000-DSC2910).

The micro activity test on light oil is conducted at 460° C. by using Dagang light diesel with a distillation range of 235-335° C. as feedstock with the catalyst-oil ratio of 3.2 and the weight hourly space velocity of 16 $h^{-1}$.

The micro activity test on heavy oil is conducted at 482° C. with the catalyst-oil ratio of 4.

Examples 1-7 are used to illustrate the preparing procedure and physical-chemical parameters of the rare-earth Y-zeolite disclosed in present invention.

Example 1

The NaY zeolite having a solid content of 85% (having an Si/Al ratio of 4.0, a unit cell size of 2.473 nm, an $Al_2O_3$ content of 24.8%, and a $Na_2O$ content of 16%, and produced by Zhoucun Catalyst Factory, Qilu Petrochemical Company) was ion exchanged with a rare-earth solution having a ratio of $NaY:RECl_3: H_2O$=1:0.10:10 at 80-90° C. for 60 min, and dried till the water content was less than 10% (by weight, similarly hereinafter) and the $RE_2O_3$ content was 4.7% (by weight, similarly hereinafter), in which the $La_2O_3$ content was 1.2%, the $Ce_2O_3$ content was 2.4%, and the content of other rare-earth oxides was 1.1%. With a ratio of $RENaY:SiCl_4$=1:0.4, reacting at 550° C. for 120 min to obtain a sample, designated as SSY-1. The physical-chemical parameters are listed in Table 1.

Example 2

The NaY zeolite having a solids content of 75% (having an Si/Al ratio of 5.05, a unit cell size of 2.466 nm, an $Al_2O_3$ content of 21.2%, and a $Na_2O$ content of 15.8%, and produced by Zhoucun Catalyst Factory, Qilu Petrochemical Company) was ion exchanged with a rare-earth solution having a ratio of NaY:RECl$_3$: H$_2$O=1:0.25:10 at 80-95° C. for 40 min, and then was filtered, washed, dried and dehydrated. The RE$_2$O$_3$ content was 8.0%, in which the La$_2$O$_3$ content was 2.08%, the Ce$_2$O$_3$ content was 4.08%, and the content of other rare-earth oxides was 1.84%. With a ratio of RENaY:SiCl$_4$=1: 0.25, reacting at 450° C. for 60 min to obtain a sample, designated as SSY-2. The physical-chemical parameters are listed in Table 1.

Example 3

The REHY zeolite (having an RE$_2$O$_3$ content of 9.0 wt %, in which the La$_2$O$_3$ content was 2.3 wt %, the Ce$_2$O$_3$ content was 4.6 wt %, and the content of other rare-earth oxides was 2.1 wt %, the unit cell size being 2.469 nm, the differential thermal collapse temperature being 985° C., the Na$_2$O content being 4.4 wt %, and produced by Zhoucun Catalyst Factory, Qilu Petrochemical Company) was put into a reactor and dried till the water content less than 5%. With a ratio of REHY:SiCl$_4$=1:0.7, reacting at 100° C. for 3 hours to obtain a sample, designated as SSY-3. The physical-chemical parameters are listed in Table 1.

Example 4

The NaY zeolite having a solid content of 85% (having an Si/Al ratio of 4.0, a unit cell size of 2.473 nm, an Al$_2$O$_3$ content of 24.8%, and a Na$_2$O content of 16%, and produced by Zhoucun Catalyst Factory, Qilu Petrochemical Company) was ion exchanged with a rare-earth solution having a ratio of NaY:RECl$_3$: H$_2$O=1:0.21:10 at 80-90° C. for 60 min, and dried till the water content was less than 7% and the RE$_2$O$_3$ content was 12%, in which the La$_2$O$_3$ content was 3.12%, the Ce$_2$O$_3$ content was 6.1%, and the content of other rare-earth oxides was 2.78%. With a ratio of RENaY:SiCl$_4$=1:0.4, reacting at 550° C. for 120 min to obtain a sample, designated as SSY-4. The physical-chemical parameters are listed in Table 1.

Example 5

The REY zeolite with a solid content of 85% (having an RE$_2$O$_3$ content of 16%, in which the La$_2$O$_3$ content was 12.6 wt %, the Ce$_2$O$_3$ content was 2.5 wt %, and the content of other rare-earth oxides was 0.9 wt %, the zeolite's unit cell size being 2.469 nm, the differential thermal collapse temperature being 980° C., the Na$_2$O content being 2.7 wt %, and produced by Zhoucun Catalyst Factory, Qilu Petrochemical Company) was put into a reactor and dried till the water content less than 5%. With a ratio of REY:SiCl$_4$=1:0.8, reacting with the SiCl$_4$ carried by the dry air at 350° C. for 120 min to obtain a sample, designated as SSY-5. The physical-chemical parameters are listed in Table 1.

Example 6

The NaY zeolite having a solid content of 85% (having an Si/Al ratio of 4.0, a unit cell size of 2.473 nm, an Al$_2$O$_3$ content of 24.8%, and a Na$_2$O content of 16%, and produced by Zhoucun Catalyst Factory, Qilu Petrochemical Company) was ion exchanged with a rare-earth solution having a ratio of NaY:RECl$_3$: H$_2$O=1:0.25:10 at 80-90° C. for 60 min, and the RE$_2$O$_3$ content was 14%, in which the La$_2$O$_3$ content was 3.64%, the Ce$_2$O$_3$ content was 7.14%, and the content of other rare-earth oxides was 3.22%. With a ratio of RENaY:SiCl$_4$=1: 0.4, reacting at 250° C. for 4 hours to obtain a sample, designated as SSY-6. The physical-chemical parameters are listed in Table 1.

Example 7

The NaY zeolite having a solid content of 75% (having an Si/Al ratio of 5.05, a unit cell size of 2.466 nm, an Al$_2$O$_3$ content of 21.2%, and an Na$_2$O content of 15.8%, and produced by Zhoucun Catalyst Factory, Qilu Petrochemical Company) was ion exchanged with a rare-earth solution having a ratio of NaY:RECl$_3$:H$_2$O=1:0.20:10 at 80-95° C. for 40 min, then filtered and washed. The RE$_2$O$_3$ content was 12%, in which the La$_2$O$_3$ content was 3.12%, the Ce$_2$O$_3$ content was 6.12%, and the content of other rare-earth oxides was 2.76%. With a ratio of RENaY:SiCl$_4$=1:0.3, reacting at 160° C. for 60 min to obtain a sample, designated as SSY-7. The physical-chemical parameters are listed in Table 1.

Comparative Example 1

Using the REY zeolite (having an RE$_2$O$_3$ content of 16.6%, in which the La$_2$O$_3$ content was 12.9 wt %, the Ce$_2$O$_3$ content was 2.1 wt %, and the content of other rare-earth oxides was 1.6 wt %, the zeolite's unit cell size being 2.470 nm, the differential thermal collapse temperature being 980° C., the Na$_2$O content being 2.7 wt %, and produced by Zhoucun Catalyst Factory, Qilu Petrochemical Company) as comparative sample, its physical-chemical parameters are listed in Table 1.

Comparative Example 2

Using the REHY zeolite (having an RE$_2$O$_3$ content of 13.6 wt %, in which the La$_2$O$_3$ content was 11.4 wt %, the Ce$_2$O$_3$ content was 1.9 wt %, and the content of other rare-earth oxides was 0.3 wt %, the zeolite's unit cell size being 2.469 nm, the differential thermal collapse temperature being 985° C., the Na$_2$O content being 4.4 wt %, and produced by Zhoucun Catalyst Factory, Qilu Petrochemical Company) as comparative sample, its physical-chemical parameters are listed in Table 1.

Comparative Example 3

The NaY zeolite having a solids content of 75% (having an Si/Al ratio of 5.05, a unit cell size of 2.466 nm, an Al$_2$O$_3$ content of 21.2%, and a Na$_2$O content of 15.8%, and produced by Zhoucun Catalyst Factory, Qilu Petrochemical Company) was ammonium-sulfate ion-exchanged with a rare-earth solution having a ratio of NaY: (NH$_4$)$_2$SO$_4$: H$_2$O=1:0.5:10 at 80-95° C. for 40 min, then filtered, and washed. The exchanged zeolite was calcinated at 550° C.-650° C. for 2 hours, further ammonium-sulfate ion-exchanged with a rare-earth solution having a ratio of NaY: (NH$_4$)$_2$SO$_4$: H$_2$O=1:0.5:10 for 40 min, then filtered, washed, and calcinated at 550° C.-650° C. for 2 hours to obtain a sample designated as USY. The obtained USY sample was exchanged with a rare-earth solution having a ratio of USY: RECl$_3$:H$_2$O=1:0.25:10 at 80-95° C. for 40 min, then filtered, washed and dried to obtain a sample designated as REUSY-1, wherein the $RE_2O_3$ content was 2.5 wt %, in which the $La_2O_3$ content was 2.0 wt %, the $Ce_2O_3$ content was 0.35 wt %, the content of other rare-earth oxides was 0.15 wt %, and the unit cell size of zeolite was 2.453 nm. The physical-chemical parameters are listed in Table 1.

Comparative Example 4

The NaY zeolite having a solids content of 85% (having an Si/Al ratio of 4.0, a unit cell size of 2.473 nm, an $Al_2O_3$ content of 24.8%, and a $Na_2O$ content of 16%, and produced by Zhoucun Catalyst Factory, Qilu Petrochemical Company) was ammonium-sulfate ion-exchanged with a rare-earth solution having a ratio of NaY: $(NH_4)_2SO_4$: $H_2O$=1:0.5:10 at 80-90° C. for 40 min, then filtered, and washed. The exchanged zeolite was calcinated at 550° C.-650° C. for 2 hours, further ammonium-sulfate ion-exchanged with a rare-earth solution having a ratio of NaY: $(NH_4)_2SO_4$: $H_2O$=1:0.5:10 for 40 min, then filtered, washed, and calcinated at 550° C.-650° C. for 2 hours to obtain a sample designated as USY. The obtained USY sample was exchanged with a rare-earth solution having a ratio of USY:$RECl_3$:$H_2O$=1:0.15:10 at 80-95° C. for 40 min, then filtered, washed and dried to obtain a sample designated as REUSY-2, wherein the $RE_2O_3$ content was 1.5 wt %, in which the $La_2O_3$ content was 1.2 wt %, the $Ce_2O_3$ content was 0.21 wt %, the content of other rare-earth oxides was 0.09 wt %, and the unit cell size of zeolite was 2.445 nm. The physical-chemical parameters are listed in Table 1.

Comparative Example 5

The SSY-4 zeolite sample prepared in Example 5 was put into the container. The zeolite and the decationized water were pulped with a ratio of the zeloite:$H_2O$=1:20, warming up to 60-70° C., stirring for 10-30 min at this temperature, filtered and leached by decationized water at 60° C. with a ratio of the zeolite:$H_2O$=1:10, dried to obtain a sample designated to DSSY-4. The physical-chemical parameters are listed in Table 1.

Comparative Example 6

Using SSY-5 of Example 4 to obtain a sample designated DSSY-5 according to the conditions of Comparative Example 5. The physical-chemical parameters are listed in Table 1.

TABLE 1

| Example | Zeolite code | Original unit cell size, nm | $RE_2O_3$, wt % | $Na_2O$, wt % | Differential thermal collapse temperature ° C. | Equilibrium unit cell size*, nm |
| --- | --- | --- | --- | --- | --- | --- |
| 1 | SSY-1 | 2.440 | 4.7 | 0.48 | 1010 | 2.435 |
| 2 | SSY-2 | 2.455 | 8 | 0.43 | 1020 | 2.438 |
| 3 | SSY-3 | 2.457 | 8.9 | 0.35 | 1016 | 2.442 |
| 4 | SSY-4 | 2.446 | 10 | 0.49 | 1005 | 2.445 |
| 5 | SSY-5 | 2.458 | 15.0 | 0.43 | 1001 | 2.441 |
| 6 | SSY-6 | 2.459 | 13.2 | 0.32 | 1010 | 2.443 |
| 7 | SSY-7 | 2.450 | 11.0 | 0.30 | 1001 | 2.438 |
| Comparative Example 1 | REY | 2.470 | 16.6 | 2.7 | 980 | 2.430 |
| Comparative Example 2 | REHY | 2.469 | 13.6 | 4.4 | 985 | 2.426 |
| Comparative Example 3 | REUSY-1 | 2.453 | 2.5 | 2.1 | 1000 | 2.426 |
| Comparative Example 4 | REUSY-2 | 2.445 | 1.5 | 2.2 | 1000 | 2.420 |
| Comparative Example 5 | DSSY-4 | 2.446 | 8.6 | 0.21 | 1005 | 2.438 |
| Comparative Example 6 | DSSY-5 | 2.458 | 12.5 | 0.19 | 1001 | 2.435 |

*The unit cell size is measured when zeolite is aged for 17 hours at 800 ° C. with 100% vapor.

The following examples are used to further illustrate the preparation process for the catalyst according to the present invention.

Example 8

Adding 1.44 kg of SSY-1 Y-zeolite prepared in Example 1 into 2.16 kg of distilled water, after pulping and homogenizing until the PH=0.5-3.0, mixing with 5.2 kg of pseudoboehmite (having a solids content of 10%, and produced by Shandong Aluminum Company), stirring for 1 hr, then adding 5.36 kg of the Suzhou Kaolin slurry (having a solids content of 38%, and produced by Chinese Kaolin Company), mixing and pulping for 1.5 hours, forming by spray-drying, washing, filtering and drying to obtain a catalyst sample designated as C-1. The properties of the catalyst are shown in Table 2.

Comparative Example 7

This comparative example is used to illustrate the preparation process of the catalyst using REUSY as the Y-type molecular sieve.

Adding 2.1 kg of Suzhou Kaolin (having a solid content of 83%, and produced by Chinese Kaolin Company) to 10.7 kg of decationized water and stirring for 1.5 hours. Adding 0.65 kg of pseudoboehmite (having a solids content of 65%, and produced by Shandong Aluminum Company) and stirring for another 1 hour. Adding 0.036 L of HCl (industry grade) and stirring for 10 min. Warming up to 60° C. and aging for 1 hour, then adding 2 kg of alumina sol (having an $Al_2O_3$ content of 21.5%, and produced by Qilu Catalyst Factory), and stirring homogenously. Adding a mixed rare-earth chloride solution (having a $RE_2O_3$ concentration of 285 g/l), then adding ammonia to adjust pH to above 3, and stirring for 0.5 hour. Finally adding 2.3 kg of REUSY molecular sieve (having a unit cell size of 2.450 nm, a $RE_2O_3$ content of 3 wt %, a $Na_2O$ content of 1.0 wt %, and a solid content of 78%, and produced by Qilu Catalyst Factory), and stirring for 0.5 hour. The catalyst was obtained by forming by spray drying, calcinating at 450° C. for 1 hr, washing, filtering and drying, and designated as M-1. The properties of the catalyst are shown in Table 3.

Example 9

Adding 1.43 kg of SSY-2 Y-zeolite prepared in Example 2 to 2.4 kg of decationized water to pulp and homogenize, and mixing with 8.2 kg of pseudoboehmite (having a solid content of 12%, and produced by Shandong Aluminum Company) which was acidified and peptized by 0.015 L of HCL (industry grade). After stirring for 1 hour, adding 7.8 kg of Suzhou Kaolin slurry (having a solid content of 20%, and produced by Chinese Kaolin Company), then adding 1 kg of alumina sol (having an $Al_2O_3$ content of 21.5%, and produced by Qilu Catalyst Factory), mixing and pulping for 1.5 hours, forming by spray drying, washing, filtering, and drying to obtain a catalyst sample designated as C-2. The properties of the catalyst are shown in Table 2.

Comparative Example 8

This comparative example is used to illustrate the preparation process of the catalyst using REHY and REUSY as the Y-type sieve.

Adding 9.3 kg of Suzhou Kaolin (having a solid content of 83%, and produced by Chinese Kaolin Company) to 16 kg of decationized water and stirring for 1 hour. Adding 1.2 kg of pseudoboehmite (having a solids content of 65%, and produced by Shandong Aluminum Company) and stirring for another 1 hour. Adding 0.16 L of HCl (industry grade) and stirring for 10 min. Warming up to 60° C. and aging for 1 hour, then adding 1.9 kg of alumina sol (having an $Al_2O_3$ content of 21.5%, and produced by Qilu Catalyst Factory), and stirring for 0.5 hour. Adding 5.1 kg of REHY molecular sieve (having a unit cell size of 2.469 nm, an $RE_2O_3$ content of 8.8%, a $Na_2O$ content of 4.2%, and a solid content of 85%, and produced by Qilu Catalyst Factory) prepared by hydrothermal method and ion exchange process. Adding 2.7 kg of REUSY molecular sieve (having a unit cell size of 2.450 nm, an $RE_2O_3$ content of 3 wt %, a $Na_2O$ content of 2.0 wt %, and a solid content of 78%, and produced by Qilu Catalyst Factory), mixing and stirring for 0.5 hour. The catalyst was obtained by forming by spray drying, calcinating at 400° C. for 1 hr, washing, filtering and drying, and designated as M-2. The properties of the catalyst are shown in Table 3.

Example 10

Adding 1.2 kg of SSY-3 zeolite prepared in Example 3 to 1.8 kg of decationized water to pulp and homogenize, and mixing with 6.2 kg of pseudoboehmite (having a solid content of 11%, and produced by Shandong Aluminum Company) which was acidified and peptized by 0.009 L of HCL (industry grade). After mixing and stirring for 1 hour, adding 5.7 kg of Suzhou Kaolin slurry (having a solid content of 25%, and produced by Chinese Kaolin Company), then adding 0.5 kg of alumina sol (having an $Al_2O_3$ content of 21.5%, and produced by Qilu Catalyst Factory), mixing and pulping for 2 hours, forming by spray drying, washing, filtering, and drying to obtain a catalyst sample designated as C-3. The properties of the catalyst are shown in Table 2.

Example 11

Adding 1.6 kg of SSY-4 Y-zeolite prepared in Example 4 to 2.16 kg of decationized water. After pulping and homogenizing, adding to 7.8 kg of pseudoboehmite slurry (having a solid content of 15%, and produced by Shandong Aluminum Company). After stirring for 1 hour, adding 6.4 kg of Suzhou Kaolin slurry (having a solid content of 27%, and produced by Chinese Kaolin Company), mixing and pulping for 1.5 hours, forming by spray drying, washing, filtering, and drying to obtain a catalyst sample designated as C-4. The properties of the catalyst are shown in Table 2.

Using a high resolution environment scanning electron microscope (FEI Quantan 200 FEG), the catalyst particles were subjected to a secondary electron imaging with a low vacuum mode and an accelerating voltage of 20 KV under a pressure in the sample chamber of 100 Pa; the morphology-image analysis is conducted on the catalyst particles with a magnification of 800×-1500×; and the element content measurement is conducted on the support surfaces of the catalyst particles using an EDX energy spectrometer. The results are shown in Table 20.

Comparative Example 9

This comparative example is used to illustrate the preparation process of the comparative catalyst using P-REHY and ZRP as the molecular sieve and using alumina sol and pseudoboehmite as the binder.

Adding 1.6 kg of Suzhou Kaolin (having a solids content of 83%, and produced by Chinese Kaolin Company) to 21 kg of decationized water, and stirring for 1 hour. Then adding 1.2 kg of pseudoboehmite (having a solid content of 65%, and produced by Shandong Aluminum Company), and stirring for 1 hour. Adding 0.04 L of HCl (industry grade) and stirring for 10 min. After warming up to 60° C. and aging for 1 hour, adding 1.9 kg of alumina sol (having an $Al_2O_3$ content of 21.5%, and produced by Qilu Catalyst Factory), and stirring for 1 hour. Then adding 1.8 kg of phosphorus rare-earth hydrogen Y-zeolite P-REHY-1 (having a unit cell size of 2.469 nm, an $RE_2O_3$ content of 8.2 wt %, a $Na_2O$ content of 2.2 wt %, a $P_2O_3$ content of 2.4 wt %, and a solid content of 85%, and produced by Qilu Catalyst Factory), and adding 0.09 kg of ZRP shape selective molecular sieve (having a solid content of 90%, a Si/Al ratio of 50, and a $Na_2O$ content less than 1 wt %, and produced by Qilu Catalyst Factory) and stirring for 1 hour. The catalyst was formed by spray drying, calcinating at 500° C. for 1 hr, washing, filtering and drying, and designated as M-3. The properties of the catalyst are shown in Table 3.

Example 12

Adding 0.86 kg of SSY-5 zeolite prepared in Example 5 and 0.06 kg of ZRP shape selective molecular sieve (having a solids content of 90%, a Si/Al ratio of 50, and a $Na_2O$ content less than 1 wt %, and produced by Qilu Catalyst Factory) to 2.7 kg of decationized water. After pulping and homogenizing, 8.8 kg of Suzhou Kaolin slurry (having a solids content of 20%, and produced by Chinese Kaolin Company) was added. After stirring 1 hour, adding 4.5 kg of alumina sol (having an $Al_2O_3$ content of 21.5%, and produced by Qilu Catalyst Factory), mixing and pulping for 1 hour, then forming by spray drying, washing, filtering, and drying to obtain a catalyst sample designated as C-5. The properties of the catalyst are shown in Table 2.

Comparative Example 10

This comparative example is used to illustrate the preparation process of the catalyst using P-REHY and ZRP as the molecular sieve and using alumina sol as the binder.

Adding 2.2 kg of Suzhou Kaolin (having a solid content of 73%, and produced by Chinese Kaolin Company) to 16.7 kg of decationized water, and stirring for 1 hour. Then adding 4.7 kg of alumina sol (having an $Al_2O_3$ content of 21.5%, and produced by Qilu Catalyst Factory), and stirring for 1 hour. Then adding 2.2 kg of phosphorus rare-earth hydrogen Y-zeolite P-REHY-2 (having a unit cell size of 2.467 nm, an $RE_2O_3$ content of 9 wt %, a $Na_2O$ content of 2.5 wt %, a $P_2O_5$ content of 2.0 wt %, and a solid content of 85%, and produced by Qilu Catalyst Factory), and adding 0.06 kg of ZRP shape selective molecular sieve (having a solids content of 90%, a Si/Al ratio of 50, and a $Na_2O$ content less than 1 wt %, and produced by Qilu Catalyst Factory) and stirring for 1 hour. The catalyst was formed by spray drying, calcinating at 400° C. for 1 hr, washing, filtering and drying, and designated as M-4. The properties of the catalyst are shown in Table 3.

Example 13

Adding 0.56 kg of SSY-5 Y-zeolite prepared in Example 5 to 1.12 kg of decationized water. After pulping and homogenizing, 16.6 kg of Suzhou Kaolin slurry (having a solids content of 15%, and produced by Chinese Kaolin Company) was added. After mixing and stirring for 1 hour, adding 3.9 kg of silica sol (having an $SiO_2$ content of 15.5%, and produced by Beijing Changhong Middle School Chemical Factory), mixing and pulping for 2 hours, then forming by spray drying, washing, filtering, and drying to obtain a catalyst sample designated as C-6. The properties of the catalyst are shown in Table 2.

Example 14

Adding 1.17 kg of SSY-6 Y-zeolite prepared in Example 6 to 2.34 kg of decationized water to pulp and homogenize, and mixing with 8.2 kg of pseudoboehmite (having a solid content of 12%, and produced by Shandong Aluminum Company) which was acidified and peptized by 0.006 L of HCL (industry grade). After mixing and stirring for 1 hour, adding 10.8 kg of Suzhou Kaolin slurry (having a solids content of 35%, and produced by Chinese Kaolin Company), then mixing and pulping for 2 hours, forming by spray drying, washing, filtering, and drying to obtain a catalyst sample designated as C-7. The properties of the catalyst are shown in Table 2.

Example 15

Adding 0.45 kg of SSY-7 Y-zeolite prepared in Example 7 to 1.4 kg of decationized water to pulp and homogenize, and mixing with 7.2 kg of pseudoboehmite (having a solid content of 11%, and produced by Shandong Aluminum Company) which was acidified and peptized by 0.005 L of HCL (industry grade). After stirring for 1 hour, adding 5.3 kg of Suzhou Kaolin slurry (having a solids content of 30%, and produced by Chinese Kaolin Company), then mixing and pulping for 2 hours, forming by spray drying, washing, filtering, and drying to obtain a catalyst sample designated as C-8. The properties of the catalyst are shown in Table 2.

Comparative Example 11

This comparative example is used to illustrate the preparation process of the catalyst using REHY as the molecular sieve.

Adding 2.3 kg of Suzhou Kaolin (having a solids content of 73%, and produced by Chinese Kaolin Company) to 20 kg of decationized water and stirring for 1 hour. Adding 1 kg of pseudoboehmite (having a solids content of 65%, and produced by Shandong Aluminum Company) and stirring for another 1 hour. Adding 0.2 L of HCl (industry grade) and stirring for 10 min. Warming up to 60° C. and aging for 1 hour, then adding 2.3 kg of alumina sol (having an $Al_2O_3$ content of 21.5%, and produced by Qilu Catalyst Factory), and stirring for 0.5 hour. Adding 2.1 kg of REHY (having a solids content of 83%, a unit cell size of 2.469 nm, a $RE_2O_3$ content of 8.2 wt %, and a $Na_2O$ content of 4.2 wt %, and produced by Qilu Catalyst Factory), and mixing and stirring for 1 hour. The catalyst was obtained by forming by spray drying, calcinating at 450° C. for 1 hr, washing, filtering and drying, and designated as M-5. The properties of the catalyst are shown in Table 3.

Comparative Example 12

This comparative example is used to illustrate the preparation process of the catalyst using REY as the molecular sieve.

Adding 1.6 kg of Suzhou Kaolin (having a solid content of 85%, and produced by Chinese Kaolin Company) to 16 kg of decationized water and stirring for 1 hour. Adding 1.2 kg of pseudoboehmite (having a solids content of 65%, and produced by Shandong Aluminum Company) and stirring for another 1 hour. Adding 0.16 L of HCl (industry grade) and stirring for 10 min. Warming up to 60° C. and aging for 1 hour, then adding 1.9 kg of alumina sol (having an $Al_2O_3$ content of 21.5%, and produced by Qilu Catalyst Factory), and stirring for 0.5 hour. Adding 2.1 kg of the rare-earth Y-zeolite REY (having a solid content of 90%, a unit cell size of 2.467 nm, a $RE_2O_3$ content of 13.7 wt %, and a $Na_2O$ content of 4.2 wt %, and produced by Qilu Catalyst Factory), and mixing and stirring for 1 hour. The catalyst was formed by spray drying, calcinating at 450° C. for 1 hr, washing, filtering and drying, and designated as M-6. The properties of the catalyst are shown in Table 3.

Example 16

Adding 1.1 kg of SSY-3 zeolite prepared in Example 3 to 3.2 kg of decationized water to pulp and homogenize, and mixing with 5.6 kg of pseudoboehmite (having a solid content of 14%, and produced by Shandong Aluminum Company) which was acidified and peptized by 0.007 L of HCL (industry grade). After stirring for 1 hour, adding 3.4 kg of Suzhou Kaolin slurry (having a solid content of 35%, and produced by Chinese Kaolin Company), then adding 0.5 kg of alumina sol (having an $Al_2O_3$ content of 21.5%, and produced by Qilu Catalyst Factory), then mixing and pulping for 2 hours, forming by spray drying, washing, filtering, and drying to obtain a catalyst sample designated as C-9. The properties of the catalyst are shown in Table 2.

TABLE 2

| Example | Catalyst code | RE₂O₃ wt % | Al₂O₃ wt % | SiO₂ wt % | Na₂O wt % | Specific surface area, m²/g | Nitrogen adsorption $V_{Pore}$ | $V_{micropore}$ | Abrasion index | The content of the rare-earth atoms (La + Ce) in the catalyst support wt % |
|---|---|---|---|---|---|---|---|---|---|---|
| 8  | C-1 | 1.4 | 42.9 | 43.6 | 0.17 | 266 | 0.184 | 0.073 | 2.0 | 1.27 |
| 9  | C-2 | 2.4 | 47.9 | 42.0 | 0.12 | 268 | 0.192 | 0.067 | 1.2 | 1.82 |
| 10 | C-3 | 3.1 | 40.9 | 41.8 | 0.16 | 290 | 0.181 | 0.032 | 1.8 | 2.58 |
| 11 | C-4 | 4.2 | 49.0 | 40.5 | 0.14 | 266 | 0.171 | 0.640 | 1.4 | 3.05 |
| 12 | C-5 | 3.6 | 49,0 | 42,3 | 0.17 | 254 | 0.190 | 0.080 | 1.6 | 3.40 |
| 13 | C-6 | 3.0 | 48.0 | 43.5 | 0.09 | 212 | 0.184 | 0.038 | 1.4 | 4.05 |
| 14 | C-7 | 3.2 | 50.0 | 41.8 | 0,06 | 270 | 0.190 | 0,047 | 1.2 | 5.80 |
| 15 | C-8 | 1.8 | 48.0 | 42.0 | 0.12 | 265 | 0.194 | 0.039 | 1.7 | 3.20 |
| 16 | C-9 | 3.0 | 46.6 | 43.8 | 0.18 | 303 | 0.203 | 0.089 | 2.0 | 3.84 |

TABLE 3

| Comparative Example | Catalyst Code | RE₂O₃ wt % | Al₂O₃ wt % | SiO₂ wt % | Na₂O wt % | Specific surface area, m²/g | Nitrogen adsorption $V_{Pore}$ | $V_{micropore}$ | Abrasion index | The content of the rare-earth atoms (La + Ce) in the catalyst support wt % |
|---|---|---|---|---|---|---|---|---|---|---|
| 7  | M-1 | 1.7 | 49.5 | 38.5 | 0.35 | 268 | 0.178 | 0.083 | 2.3 | 0.2 |
| 8  | M-2 | 2.5 | 55   | 36.1 | 0.38 | 263 | 0.210 | 0.086 | 2.4 | 0.35 |
| 9  | M-3 | 3.2 | 51   | 37.1 | 0.38 | 272 | 0.188 | 0.073 | 2.3 | 0.48 |
| 10 | M-4 | 3.6 | 50   | 39.0 | 0.32 | 262 | 0.199 | 0.073 | 1.7 | 0.65 |
| 11 | M-5 | 3.2 | 57   | 36.4 | 0.22 | 260 | 0,199 | 0.073 | 1.8 | 0.34 |
| 12 | M-6 | 5.5 | 57   | 36.0 | 0,16 | 242 | 0.181 | 0.067 | 1.9 | 0.85 |
| 13 | M-7 | 3.0 | 45   | 37.6 | 0.20 | 204 | 0.172 | 0.064 | 2.0 | 0.28 |

The following examples are used to illustrate the reaction properties of the catalyst of the present invention for all kinds of petroleum hydrocarbon raw oils.

Example 17

The raw oil I (Liaohe wax oil, its properties shown in Table 4) was used in a fixed fluid-bed at 500° C. with a weight hourly space velocity (WHSV) of 12 h⁻¹, a catalyst-oil ratio of 5, and a water content (based on raw material) of 10 wt %, to valuate the present catalysts C-1, C-3 (having a rare-earth Y-type molecular sieve content of 35 wt %) and the comparative catalyst M-1 (having a molecular sieve content of 40 wt %) which had been aged at 800° C. for 8 hours under a 100% steam atmosphere. The valuation results are listed in Table 5.

As seen from Table 5, the catalysts C-1 and C-3 have a high conversion for heavy oil. The un-converted content of heavy oil is less than that of comparative catalyst M-1, especially for C-3 whose un-converted content of heavy oil is lower than that of comparative catalyst M-1 by 4%. The yield of light oil is higher than that of comparative catalyst by about 1-2%. From the view of the product distribution, the catalytic selectivity for gasoline, coke and dry gas is better than that of the comparative catalyst at a similar conversion. So the catalyst disclosed in the present invention is an excellent cracking catalyst for heavy oil.

Example 18

The raw oil II (its properties shown in Table 6) was used to react in a fixed fluid-bed at 500° C. with a catalyst-oil ratio of 5 to valuate the present catalysts C-1, C-3 and the comparative catalyst M-1, which had been aged at 800° C. for 4 hours under a 100% steam atmosphere. The obtained gasoline product was analyzed by chromatographic PONA and the contents of the components in the gasoline are listed in Table 7.

As seen from Table 7, the catalysts C-1 and C-3 provided in present invention have an obvious effect on decreasing the olefin content of gasoline. Their olefin contents of gasoline can reach 17.30 wt % and 12.97 wt % respectively, lower than the olefin content 33.34 wt % of the comparative catalyst M-1. The contents of i-paraffin for C-1 and C-3 are 51.59 wt % and 55.14 wt %, higher than the content 39.41 wt % of the comparative catalyst, while remaining relatively high octane numbers. So the catalyst disclosed in the present invention is a desirable catalyst for decreasing the olefin content.

Example 19

The raw oil III (Liaohe Anshan wax oil, its properties shown in Table 8) was used in a fixed fluid-bed at 510° C. with a weight hourly space velocity (WHSV) of 20 h$^{-1}$ and a catalyst-oil ratio of 5 to valuate the present catalyst C-2 and the comparative catalyst M-2 which had been aged at 800° C. for 4 hours under a 100% steam atmosphere. The valuation results are listed in Table 9.

TABLE 4

| Raw oil I | |
|---|---|
| Density, g/cm$^{-3}$(20° C.) | 0.9275 |
| Viscosity, mm$^2$/ (50° C.) | 52.15 |
| (80° C.) | 14.93 |
| Freezing point, ° C. | 28 |
| Carbon residue, wt % | 0.25 |
| Basic nitrogen, ppm | 795 |
| Element analysis, wt % | |
| C | 86.6 |
| H | 12.04 |
| S | 0.32 |
| N | 1 |
| PONA analysis, wt % | |
| Saturated hydrocarbon | 67.5 |
| Aromatics | 23 |
| Resin | 9.5 |
| Asphaltene | 0 |
| Vacuum distillation range, ° C. | |
| IBP | 265 |
| 5% | 320 |
| 10% | 343 |
| 30% | 398 |
| 50% | 429 |
| 70% | 455 |
| 90% | 504 |

TABLE 5

| | Catalyst code | | |
|---|---|---|---|
| Product distribution, wt % | C-3 | C-1 | M-1 |
| Dry gas | 2.12 | 2.01 | 1.9 |
| LPG | 14.23 | 13.04 | 14.05 |
| GLN | 52.38 | 49.33 | 47.15 |
| LCO | 17.36 | 19.57 | 19.93 |
| Heavy oil | 9.57 | 13.01 | 13.57 |
| Coke | 4.24 | 3.04 | 3.4 |
| Conversion | 73.07 | 67.42 | 66.5 |
| Light oil yield | 69.74 | 68.9 | 67.08 |
| LPG + GLN + LCO | 84.07 | 81.94 | 81.13 |

The aging conditions for the catalyst: 800° C./8 h, 100% steam.

The reaction conditions: T=500° C., weight hourly space velocity=12 h$^{-1}$.

TABLE 6

| Raw oil II | |
|---|---|
| Density, g/cm$^3$(20° C.) | 0.907 |
| Viscosity, mm$^2$/(80° C.) | 17.17 |
| Aniline point, ° C. | 95.8 |
| Pour point, ° C. | 43 |
| Refractive index, 20° C. | 1.5217 |
| Conradson Carbon, wt % | 3.1 |
| Basic nitrogen, ppm | 1010 |
| Element analysis, wt % | |
| C | 86.37 |
| H | 12.53 |
| S | 0.8 |
| N | 0.29 |
| Ni, ppm | 7 |
| V, ppm | 0.8 |
| Distillation rang, ° C. | |
| IBP | 241 |
| 10% | 347 |
| 30% | 413 |
| 50% | 450 |
| 70% | 493 |
| 80% | 535 |
| 90% | — |

TABLE 7

| Catalyst | n-Paraffin NP | i-Paraffin ZP | Olefin O | Naphthene N | Aromatic A | Octane number RON |
|---|---|---|---|---|---|---|
| M-1 | 5.55 | 39.41 | 33.34 | 8.26 | 13.34 | 90.1 |
| C-1 | 4.79 | 51.59 | 17.3 | 8.26 | 18.06 | 91.4 |
| C-3 | 5.51 | 55.14 | 12.97 | 6.26 | 20.12 | 90 |

Note:
the PONA analysis data listed in the table 7 is in a unit of the weight percent.

TABLE 8

Raw oil III

| | |
|---|---|
| Density, g/cm$^{-3}$(20° C.) | 0.9268 |
| Viscosity, mm$^2$/(100° C.) | 9.072 |
| Freeze point, ° C. | 31 |
| Aniline point, ° C. | 78.5 |
| Carbon residue, wt % | 0.27 |
| Saturated hydrocarbon, wt % | 62 |
| Aromatics, wt % | 26.6 |
| Resin, wt % | 11.3 |
| Asphaltene, wt % | 0.1 |
| Element analysis, wt % | |
| C | 87.03 |
| H | 12.15 |
| S | 0.26 |
| N | 0.28 |
| Basic nitrogen, ppm | 865 |
| Distillation rang type | D1160 |
| IBP | 264 |
| 5% | 320 |
| 10% | 350 |
| 30% | 411 |
| 50% | 444 |
| 70% | 468 |
| 90% | 515 |

TABLE 9

| | Catalyst | |
|---|---|---|
| | C-2 | M-2 |
| Product distribution, wt % | | |
| Dry gas | 2.0 | 2.0 |
| LPG | 12.8 | 14.8 |
| C3$^=$ + C4$^=$ | 8.0 | 9.2 |
| GLN | 50.5 | 47.2 |
| LCO | 21.5 | 22.0 |
| Heavy oil | 7.8 | 9.1 |
| Coke | 4.9 | 4.5 |
| Conversion, wt % | 70.2 | 68.5 |
| GLN RON | 89.0 | 89.4 |
| GLN PONA, wt % | | |
| n-Paraffin | 4.23 | 4.39 |
| i-Paraffin | 43.23 | 40.49 |
| Naphthene | 8.23 | 9.43 |
| Olefin | 19.05 | 25.04 |
| Aromatic | 25.28 | 20.65 |
| Micro activity, MA | 82 | 77 |

The aging conditions for the catalyst: 800° C./4 h, 100% steam.

The reaction conditions: T=510° C., ratio of catalyst to oil=5, WHSV=12 h$^{-1}$.

As seen from Table 9, comparing to the comparative catalyst M-2 (two molecular sieves having a content of 41 wt %), the present catalyst C-2 (having a molecular sieve content of 32 wt %) has a high conversion for heavy oil. The yield of light oil is higher than that of the comparative catalyst by about 2.8%. At a similar octane number, the olefin content is decreased by 6%, showing a high activity for decreasing the olefin content.

Example 20

The raw oil IV with inferior quality (Liaohe wax oil: Liaohe coking gas oil: Daqing vacuumed residuum=55:20: 25, its properties shown in Table 10) was used in a fixed fluid-bed at 500° C. with a weight hourly space velocity (WHSV) of 10 h$^{-1}$ and a catalyst-oil ratio of 6 to valuate the present catalysts C-2, C-9 and the comparative catalyst M-2 which had been aged at 800° C. for 12 hours under a 100% steam atmosphere. The valuation results are listed in Table 11.

The gasoline products resulting from the above-mentioned valuation are analyzed by PONA analysis and the results are listed in Table 12.

Under the same catalyst's support, the molecular sieve contents for the present catalysts C-2 and C-9 are respectively 32% and 35%, while the molecular sieve content for the comparative catalyst is 41%. As seen from Table 11, the present catalysts C-2 and C-9 have much higher cracking activity for heavy oil than that of the comparative catalyst M-2. The yield of light oil is higher than that of the comparative catalyst by 2-3.5%. Both the selectivity of gasoline and the selectivity of coke are better than those of the comparative catalyst.

As seen from Table 12, the present catalyst still shows the activity for decreasing the olefin content even when cracking the inferior raw oil.

Example 21

The raw oil V (Daqing atmospheric residuum: Aman=20: 80) was used in a fixed fluid-bed at 520° C. with a weight hourly space velocity (WHSV) of 30 h$^{-1}$ and a catalyst-oil ratio of 4 to evaluate the present catalyst C-4 and the comparative catalysts M-5 and M-6 which had been aged at 800° C. for 4 hours under a 100% steam atmosphere. The evaluation results are listed in Table 13.

As seen from Table 13, comparing to the comparative catalysts M-5 with REHY zeolite and M-6 with REY zeolite, the present catalyst has a high yield of light oil at the similar conversion and the activity of decreasing the olefin content as well as the excellent selectivity of the coke.

TABLE 10

Raw oil IV

| | |
|---|---|
| Density, g/cm$^{-3}$(20° C.) | 0.9213 |
| Carbon residue, wt % | 23 |
| Freeze point, ° C. | 33 |
| Viscosity, mm$^2$/(80° C.) | 14 |
| Refractive index, (70° C.) | 1.4974 |
| Aniline point, ° C. | 97.2 |
| Element analysis, wt % | |
| C | 86.86 |
| H | 12.29 |
| S | 0.24 |
| N | 0.31 |
| PONA analysis, wt % | |
| Saturated hydrocarbon | 56 |
| Aromatics | 27.8 |
| Resin | 16.2 |
| Asphaltene | 0 |
| Metal content, wt % | |
| Fe | 5 |
| Ni | 3.6 |
| Cu | <0.1 |
| V | <0.1 |
| Ca | 2.5 |
| Distillation, ° C. | |
| IBP | 212 |
| 5% | 329 |
| 10% | 363 |
| 30% | 422 |

TABLE 10-continued

| Raw oil IV | |
|---|---|
| 50% | 458 |
| 70% | 518 |

TABLE 11

| | Catalyst code | | |
|---|---|---|---|
| | C-2 | C-9 | M-2 |
| WHSV, h$^{-1}$ | 10.0 | 9.8 | 9.8 |
| H$_2$—C$_2$ | 2.01 | 2.01 | 1.69 |
| C$_3$-C$_4$ | 14.64 | 13.91 | 15.33 |
| GLN(C$_5$-221° C.) | 54.94 | 57.80 | 52.86 |
| LCO(221-300° C.) | 12.92 | 11.52 | 12.97 |
| Heavy oil | 8.15 | 7.04 | 9.73 |
| Coke | 7.34 | 7.72 | 7.42 |
| Conversion, wt % | 78.93 | 81.44 | 77.30 |
| Light oil yield, wt % | 67.86 | 69.32 | 65.83 |
| Product selectivity | | | |
| H$_2$—C$_2$ yield/Conversion | 0.025 | 0.025 | 0.022 |
| C$_3$-C$_4$ yield/Conversion | 0.185 | 0.171 | 0.198 |
| GLN yield/Conversion | 0.696 | 0.710 | 0.684 |
| Coke yield/Conversion | 0.093 | 0.095 | 0.096 |
| Octane number (GC) | | | |
| MON | 78.7 | 78.1 | 78.6 |
| RON | 89.4 | 88.6 | 89.1 |

TABLE 12

| | PONA analysis, wt % | | | |
|---|---|---|---|---|
| Catalyst | Paraffin | Olefin | Naphthene | Aromatic |
| M-2 | 38.49 | 26.12 | 10.30 | 25.09 |
| C-9 | 42.55 | 22.59 | 9.65 | 25.21 |

TABLE 13

| | | Catalyst code | | |
|---|---|---|---|---|
| | Analysis item | C-4 | M-5 | M-6 |
| Molecular sieve | Type | SSY | REHY | REY |
| | Relative content, % | 35 | 35 | 35 |
| | RE$_2$O$_3$, wt % | 3.5 | 2.8 | 5.5 |
| Product distribution wt % | Dry gas | 1.6 | 2.0 | 1.9 |
| | LPG | 12.0 | 12.4 | 11.7 |
| | GLN | 49.2 | 48.2 | 49.0 |
| | LCO | 21.4 | 20.8 | 21.1 |
| | Heavy oil | 9.6 | 9.5 | 9.0 |
| | Coke | 5.7 | 6.6 | 6.7 |
| | Conversion | 68.5 | 69.2 | 69.3 |
| | GLN + LCO | 70.6 | 69 | 70.1 |
| | GLN + LCO + LPG | 82.6 | 81.4 | 81.8 |
| | RON | 88.3 | 89.5 | 89.9 |
| | Olefin | 25.82 | 27.65 | 23.69 |

Example 22

The raw oil VI (Daqing atmospheric residuum, its properties shown in Table 14) was used in a fixed fluid-bed at 500° C. with a weight hourly space velocity (WHSV) of 30 h$^{-1}$ and a catalyst-oil ratio of 4 to evaluate the present catalyst C-3 and the comparative catalysts M-3 (a catalyst special for decreasing the olefin content) which had been aged at 800° C. for 8 hours under a 100% steam atmosphere. The evaluation results are listed in Table 15.

TABLE 14

| Raw oil VI | |
|---|---|
| Density, g/cm$^{-3}$(20° C.) | 0.8906 |
| Viscosity, mm$^2$/(80° C.) | 44.18 |
| mm$^2$/(100° C.) | 24.84 |
| Freeze point, ° C. | 43 |
| Aniline point, ° C. | >105 |
| Conradson carbon, wt % | 4.3 |
| C/O$_2$, mol/mol | 0.55 |
| Bromine value, gBr/100 g | 3.6 |
| Refractive index, n$_D^{20}$ | 1.4957 |
| Element analysis, wt % | |
| C | 86.54 |
| H | 13.03 |
| S | 0.3 |
| N | 0.13 |
| PONA analysis, wt % | |
| Saturated hydrocarbon | 51.2 |
| Aromatics | 29.7 |
| Resin | 18.3 |
| Asphaltene | 0.8 |
| Distillation range, ° C. | |
| IBP | |
| 5% | 282 |
| 10% | 351 |
| 30% | 370 |
| 50% | 482 |
| 70% | 353 |

TABLE 15

| | Catalyst | |
|---|---|---|
| | C-3 | M-4 |
| RE$_2$O$_3$, wt % | 3.1 | 3.6 |
| Product distribution, wt % | | |
| LPG | 11.2 | 15.5 |
| GLN | 51.9 | 50.1 |
| LCO | 19.5 | 19.1 |
| Heavy oil | 8.9 | 7.3 |
| Coke | 7.6 | 7.5 |
| Conversion, wt % | 71.1 | 73.1 |
| GLN + LCO, wt % | 71.4 | 69.2 |
| GLN RON | 86.3 | 89.0 |
| GLN PONA, wt % | | |
| n-Paraffin | 5.30 | 4.28 |
| i-Paraffin | 45.61 | 43.05 |
| Naphthene | 10.64 | 9.70 |
| Olefin | 28.33 | 33.95 |
| Aromatic | 10.12 | 9.03 |
| Micro activity, MA | 69 | 73 |

As seen from Table 15, the present catalyst C-3 has a high conversion for heavy oil with a molecular content lower than that of the comparative catalyst M-4 by 5% and without the ZRP molecular sieve. The yield of light oil is higher than that of the comparative catalyst by about 2% and the olefin content is lower than that of the comparative catalyst by 5%.

Example 23

The micro activity test on heavy oil was carried out with a raw oil of 923 wax oil and a catalyst-oil ratio of 4 at 500° C. in American XYTYL.AUTO.MAT-II device by using the catalysts C-5, C-6, C-7 and the comparative catalyst M-3 which had been aged at 800° C. for 17 hours under a 100% steam atmosphere. The results are listed in Table 16.

TABLE 16

| | | Catalyst code | | | |
|---|---|---|---|---|---|
| Analysis item | | C-5 | C-6 | C-7 | M-3 |
| The molecular sieve content (relative value) | | 0.60 | 0.75 | 0.60 | base* |
| Product distribution wt % | Gas | 19.8 | 19.5 | 19.0 | 23.4 |
| | GLN | 53.0 | 53.2 | 54.8 | 47.5 |
| | LCO | 187.4 | 16.9 | 16.6 | 17.1 |
| | Coke | 1.6 | 1.6 | 1.7 | 1.5 |
| | Heavy oil | 8.2 | 8.8 | 7.9 | 10.5 |
| | Conversion | 74.4 | 74.3 | 75.5 | 72.4 |
| Light oil yield | | 70.4 | 70.1 | 71.4 | 64.6 |
| $C_4^0/C_4^=$ | | 1.19 | 1.05 | 1.0 | 0.81 |

*The content of the molecular sieve is 40%.

The content of the molecular sieve is 40%.

As seen from Table 16, the present catalysts C-5, C-6 and C-7 have a high conversion for heavy oil even with much lower zeolite content than that of the comparative catalyst. The yield of light oil is higher than that of the comparative catalyst by 5.5-6.8%. In particularly, each activity index for hydrogen transfer activity index $\Sigma C_4^0/\Sigma C_4^=$ is higher than that of the comparative catalyst. All these indicate that the activity of decreasing the olefin content of the present catalyst is better than that of the conventional catalyst used to decrease the olefin content.

Example 24

The present catalysts C-1, C-9 and the comparative catalyst M-4 were aged at 800° C. under a 100% steam atmosphere for 4 hours, 8 hours and 17 hours respectively, and then subjected to a nitrogen adsorption (BET) test. The specific surface areas measured are shown in FIG. 3.

Figure 3:
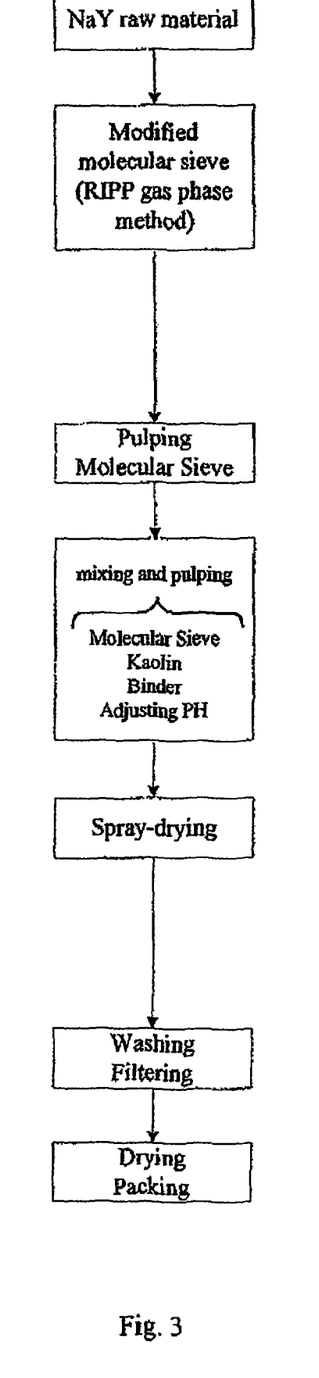
FIG. 3 is a schematic diagram of the preparation process for the catalyst according to the present invention.
Figure 4:
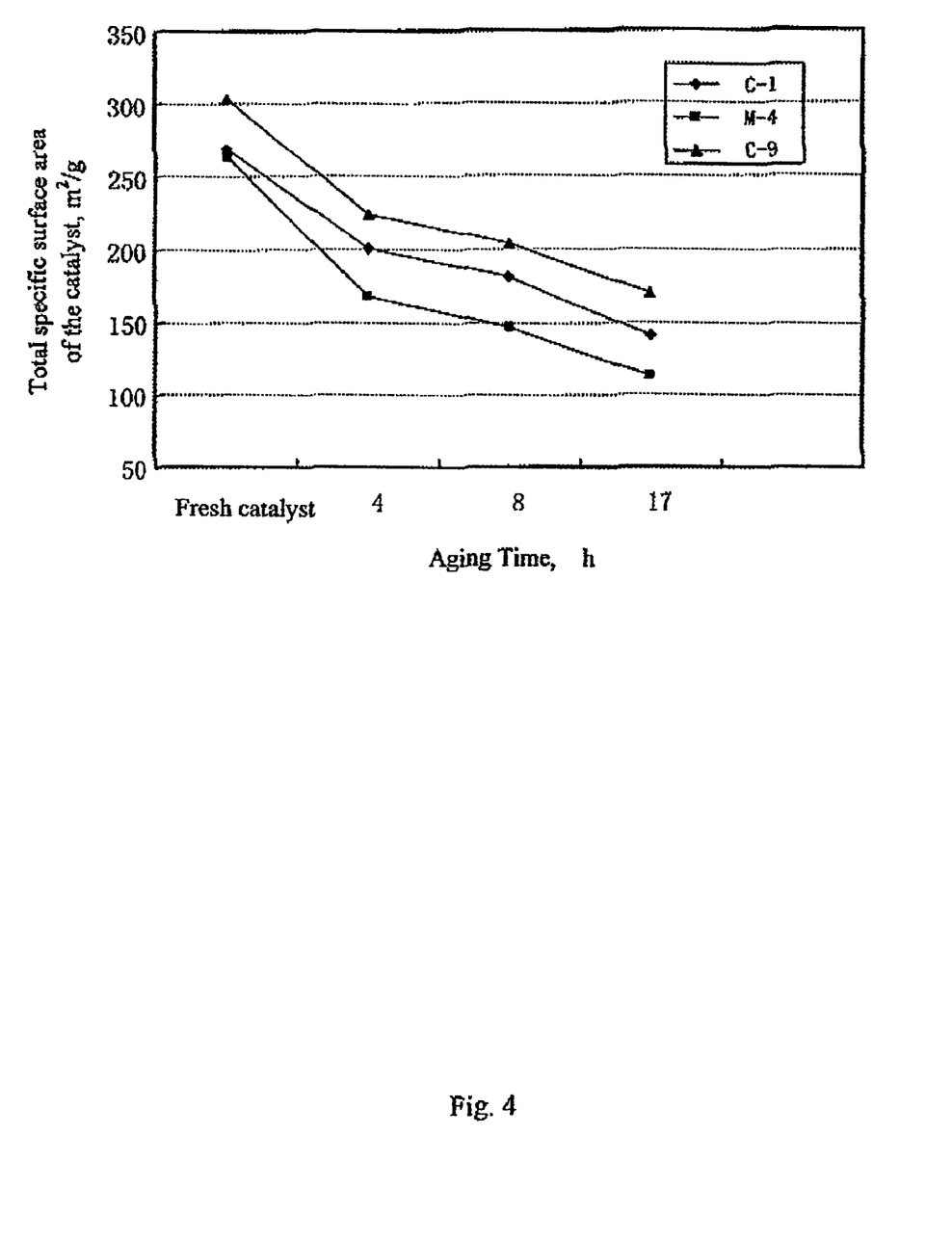
FIG. 4 is a schematic diagram showing the variation of the specific surface area of the hydrothermal-treated catalyst.

As seen from FIG. 3, comparing with the comparative catalyst, the present catalysts maintain a higher specific surface area, indicating that the present catalysts have a high hydrothermal stability.

Example 25

The present catalysts C-1 to C-9 and the comparative catalysts M-2 to M-6 were aged at 800° C. for 17 hours under a 100% steam atmosphere respectively, and then measured for the equilibrium unit cell size of the zeolite in the catalyst by XRD. The micro activity of the catalyst sample was measured by using the light oil micro activity device. The measurement results are shown in Table 17. Said micro activity is measured according to the conventional analysis method in the art.

TABLE 17

| Catalyst code | | Light oil micro activity, MAT | Equilibrium unit cell size, nm |
|---|---|---|---|
| Example | C-1 | 62 | 2.437 |
| | C-2 | 64 | 2.438 |
| | C-3 | 65 | 2.444 |
| | C-4 | 66 | 2.446 |
| | C-5 | 63 | 2.448 |
| | C-6 | 69 | 2.453 |
| | C-7 | 66 | 2.449 |
| | C-8 | 68 | 2.446 |
| | C-9 | 64 | 2.445 |
| Comparative example | M-2 | 53 | 2.420 |
| | M-3 | 49 | 2.427 |
| | M-4 | 50 | 2.420 |
| | M-5 | 57 | 2.426 |
| | M-6 | 59 | 2.428 |
| | M-7 | 60 | 2.438 |

As seen from Table 17, the unit cell size of each catalyst provided by the present invention is larger than 2.430 nm, but the unit cell size of each comparative catalyst is smaller than 2.430 nm, indicating that the catalyst provided by the present invention has a high hydrothermal stability and a high structural stability.

Comparative Example 13

Adding 1.6 kg (dry basis) of DSSY-4 zeolite prepared in Comparative Example 1 into 2.16 kg of distilled water. After pulping and homogenizing, mixing the molecular sieve with a colloid phase which was obtained by acidifying 7.8 kg of pseudoboehmite (having a solid content of 15%, and produced by Shandong Aluminum Company) with 0.22 L of HCL (industry grade) and peptizing, and then warming up to 60-70° C. and aging for 1 hour. Then stirring 0.5 hour strongly, and adding 6.4 kg of the Suzhou Kaolin slurry (having a solid content of 27%, and produced by Chinese Kaolin Company), mixing and pulping for 1.5 hours, forming by spray-drying, washing, filtering and drying to obtain a catalyst sample designated as M-7.

Using a high resolution environment scanning electron microscope (FEI Quantan 200 FEG), the catalyst particles were subjected to a secondary electron (SE) imaging with a low vacuum mode and an accelerating voltage of 20 KV under a pressure in the sample chamber of 100 Pa; the morphology-image analysis is conducted on the catalyst particles with a magnification of 800×-1500×; and the element content measurement is conducted on the support surfaces of the catalyst particles using an EDX energy spectrometer. The results are shown in Table 21.

The main physical and chemical parameters of the catalysts C-4 and M-7 are listed in Table 18.

TABLE 18

| | Catalyst | $Al_2O_3$ wt % | $RE_2O_3$ wt % | $Na_2O$ wt % | Specific surface area, m²/g | Nitrogen adsorption | | Abrasion index |
|---|---|---|---|---|---|---|---|---|
| | | | | | | $V_{Pore}$ | $V_{micropore}$ | |
| Example 8 | C-4 | 49 | 3.5 | 0.14 | 266 | 0.215 | 0.062 | 1.4 |
| Comparative Example 13 | M-7 | 45 | 2.8 | 0.20 | 204 | 0.172 | 0.064 | 2.0 |

The raw oil II (its properties shown in Table 6) was used to react in a fixed fluid-bed at 500° C. with a catalyst-oil ratio of 5 to valuate the present catalysts C-4 and the comparative catalyst M-7, which had been aged at 800° C. for 17 hours under a 100% steam atmosphere. The obtained gasoline product was analyzed by chromatographic PONA and the results are listed in Table 19.

TABLE 19

|  | Catalyst code | |
| --- | --- | --- |
|  | C-4 | M-7 |
| Product distribution, wt % |  |  |
| Dry gas | 1.74 | 1.60 |
| LPG | 18.58 | 15.45 |
| GLN | 51.10 | 47.75 |
| LCO | 15.41 | 18.34 |
| Heavy oil | 6.90 | 11.05 |
| Coke | 6.27 | 5.81 |
| Conversion, wt % | 77.69 | 70.61 |
| GLN + LCO + LPG, wt % | 85.09 | 81.54 |
| GLN RON | 83.8 | 83.5 |
| GLN PONA, wt % |  |  |
| n-Paraffin | 3.88 | 3.7 |
| i-Paraffin | 34.96 | 34.04 |
| Naphthene | 8.6 | 8.92 |
| Olefin | 18.06 | 22.77 |
| Aromatic | 34.49 | 30.52 |
| micro activity, MA | 70 | 62 |

The invention claimed is:

1. A process for preparing a cracking catalyst containing a rare-earth Y-zeolite and a support, said catalyst being characterized in that the rare-earth content of the crystal lattice of the rare-earth Y-zeolite is 4-15 wt % of $RE_2O_3$; the original unit cell size is 2.440-2.465 nm, the equilibrium unit cell size of the catalyst after 100% steam-aging treatment at 800° C. for 17 hours is larger than 2.435 nm; and the rare earth atom content in the support is 1.0-8.0 wt % of the support, said process comprising the steps of:
   (1) ultra-stabilizing the Y-zeolite, mixing the ultra-stabilized Y-zeolite directly with deionized water, pulping, and optionally milling to give a molecular sieve slurry;
   (2) mixing the molecular sieve slurry with a binder slurry and a clay and pulping, or pulping with the binder slurry and the clay in sequence, and forming by spray drying; and
   (3) washing the formed catalyst, filtering and drying.

2. The process of claim 1, wherein the reaction procedure of ultra-stabilizing the Y-zeolite in step (1) comprises: drying the Y-zeolite until its water content is less than 10 wt %; letting in $SiCl_4$ gas or $SiCl_4$ gas carried by dry air with a weight ratio of $SiCl_4$ to the Y-zeolite being 0.1-0.9:1; and reacting them at a temperature of 100-600° C. for a period of 10 min to 6 hours followed by purging the Y-zeolite with dry air for a period of 5 min to 2 hours.

3. The process of claim 1, wherein the Y-zeolite is selected from one or more of NaY zeolite, RENaY zeolite, REHY zeolite, and REY zeolite.

4. The process of claim 1, wherein the reaction procedure of ultra-stabilizing the Y-zeolite removes more than 90 wt % of $Na_2O$ in the Y-zeolite structure.

5. The process of claim 4, wherein the reaction procedure of ultra-stabilizing the Y-zeolite removes more than 93 wt % of $Na_2O$ in the Y-zeolite structure.

6. The process of claim 5, wherein the reaction procedure of ultra-stabilizing the Y-zeolite removes more than 95 wt % of $Na_2O$ in the Y-zeolite structure.

7. The process of claim 2, wherein the water content of the Y-zeolite after drying is less than 5 wt %.

8. The process of claim 2, wherein the temperature is 150-500° C.

9. The process of claim 2, wherein the molecular sieve slurry is directly used to peptize the binder slurry.

10. The process of claim 9, wherein the solid content of the binder slurry is 8-15 wt %.

11. The process of claim 1, wherein the zeolite and the water are mixed in a ratio of 1:1-10 and pulped after ultra-stabilizing the Y-zeolite in step (1).

12. The process of claim 11, wherein the zeolite and water are mixed in a ratio of 1:1.5-3.

13. The process of claim 1, wherein the molecular sieve slurry is mixed and pulped with the binder slurry, and then the resulting slurry is mixed and pulped with the clay.

14. The process of claim 1, wherein the binder is pseudo-boehmite.

15. The process of claim 2, wherein the Y-zeolite is selected from one or more of NaY zeolite, RENaY zeolite, REHY zeolite and REY zeolite.

* * * * *